Figure 1:
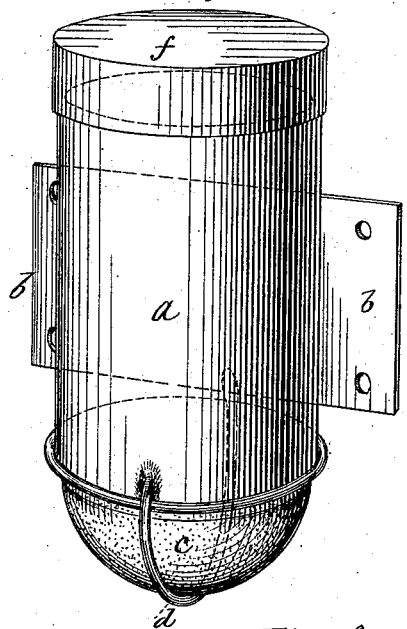

(No Model.)

C. LINDNER & T. F. HAMMER.
SALT FEEDING DEVICE.

No. 382,048.    Patented May 1, 1888.

WITNESSES
John Becker

INVENTORS:
Chas. Lindner
Thorold F. Hammer
by Chas. M. Higgins
Attorney

UNITED STATES PATENT OFFICE.

CHARLES LINDNER AND THORVALD F. HAMMER, OF BRANFORD, CONNECTICUT.

SALT-FEEDING DEVICE.

SPECIFICATION forming part of Letters Patent No. 382,048, dated May 1, 1888.

Application filed June 4, 1887. Serial No. 240,271. (No model.)

*To all whom it may concern:*

Be it known that we, CHARLES LINDNER and THORVALD F. HAMMER, of Branford, New Haven county, Connecticut, have invented certain new and useful Improvements in Salt-Feeding Devices, of which the following is a specification.

Our invention relates to means for feeding salt to cattle, horses, or other stock in such a way that they shall be able to obtain a necessary supply by licking a mass or block of solidified salt suitably presented or exposed to the use of the animals, so that they shall not be likely to obtain too much for health, or cause any unnecessary waste or destruction of the salt. To this end purified or grain salt has heretofore been formed into solid blocks or cakes by baking, a simple binding substance being sometimes combined with the salt to better solidify or agglutinate the mass, and sometimes a trace of medicinal substances—such as sulphur, blood-root, valerian, or other remedies—adapted to correct the ailments of animals, has been combined with the salt to add certain desirable hygienic or medicinal qualities. In some instances these salt stones or blocks have been placed freely exposed in places where cattle could reach and lick them, but without any protecting frame or case to inclose them. In such cases the salt block is likely to be worn away by the effects of the weather, or to be bitten, broken, or destroyed by the action of the animals, who are thus likely to take an oversupply of salt, and at the same time cause a serious waste of the salt. To prevent this, in another instance, the salt block has been made in the form of a freely-rolling cylinder or roll solidified onto a metal journal and mounted in bearings in a protecting frame or case, which exposed a peripheral portion of the roll, which the animals can reach with their tongues and lick and thus obtain a necessary supply in an economical way, the free rotation of the roll causing new parts of the periphery to constantly present themselves, and thus insure uniform wear, and also prevent the salt roll from being grasped or bitten by the animals.

In another device the salt is in the form of a non-rotating gravitating block free to slide down in an inclosing-case having an opening at the base with a narrow ledge along the back of the case, on which the back edge of the block rests. Our invention relates to this latter type of salt-feeding devices; but in our improvement the salt block rests on a narrow rounded point of support, preferably in the form of a wire loop or bail which projects from the case out under the block and bears thereon at or near the middle of the block. This construction is very simple and inexpensive, and while it supports the block centrally and prevents the block falling out even when worn down to a short stub, it yet permits of the free licking of the salt by the animal; and our invention consists in this improvement, as hereinafter set forth and claimed.

Figure 2:
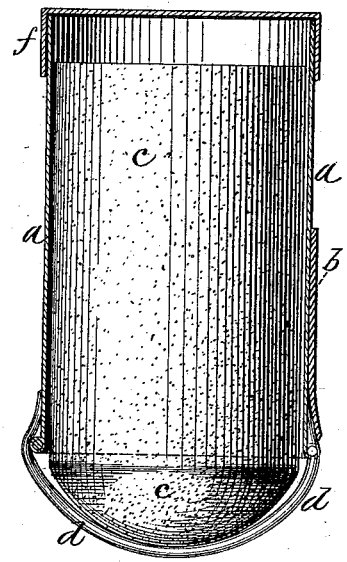
Figure 4:
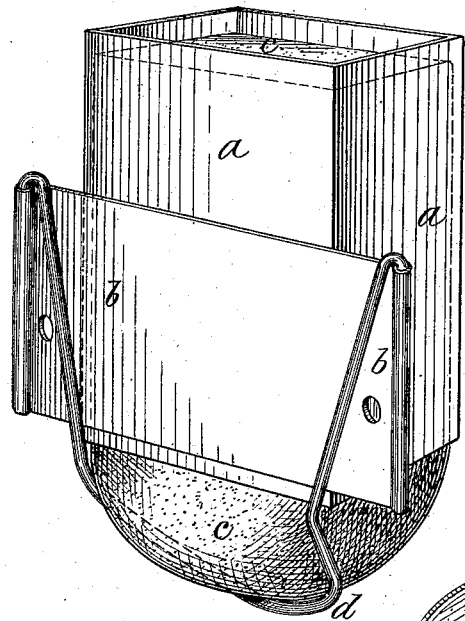
Figure 3:
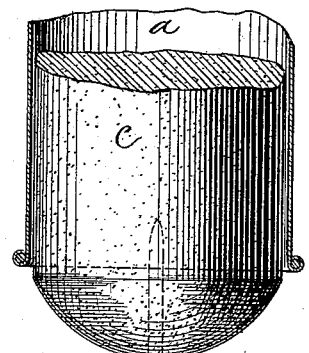
Figure 6:
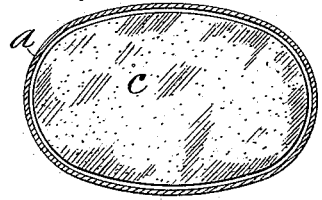
Figure 5:
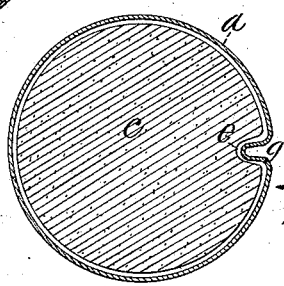

In the annexed drawings, Figure 1 represents a perspective view of our improved salt-feeding device, and Fig. 2 is a sectional side elevation thereof. Fig. 3 is a fragmentary section at right angles to Fig. 2. Fig. 4 is a perspective view of a modification. Figs. 5 and 6 are plan views of other forms or modifications.

Referring, first, to Figs. 1, 2, and 3, $a$ indicates a tubular or cylindrical case or frame, provided with a base-plate or ears, $bb$, whereby it may be nailed, screwed, or otherwise fastened in position to a wall, partition, post, or other support in the stable, barn, cattle-yard, or other place, and at a suitable height to be easily reached by the animals. Within this case is placed a cylinder or block of solidified salt, $c$, which is a free or loose fit for the case, and which naturally descends or gravitates in the case to the base thereof, which is open, and from which the lower end of the cylinder protrudes and is exposed, resting, however, on a narrow point of support, $d$, which projects from or is secured to the open end of the case. This point of support is preferably a U-shaped bail or loop of round wire, as fully shown in Figs. 1, 2, and 3, soldered at each end to the case, and the exposed end of the salt block, which is preferably rounded, rests upon the loop or bail $d$, which extends diametrically under the same, as shown. The salt block thus projects from the case at the exposed end a distance about equal to either the diameter or the radius of the salt-cylinder, and the exposed end of the salt block being preferably rounded to a hemispherical form it is thus adapted to smoothly receive the tongues of the animals licking the same.

It will be also seen that as the point of support or bail $d$ is smoothly rounded at all points, and is free from any angles, corners, or projections, it cannot hurt nor offend the tongue of the animal which may come in contact therewith.

It will be further seen, on reference to Fig. 3, that as the round wire contacts with the rounded end of the salt block in a mere line, consequently the entire surface of the exposed or rounded end of the block is practically accessible to the tongue of the animal, and as fast as thus worn away the block will gravitate or descend constantly against the bail $d$, so that the wear of the block on the exposed end will be practically uniform, and will always assume a rounded or irregularly-rounded form. The salt block, as shown in Figs. 1, 2, and 3, is a loose or free fit for the case, so that the block will always have a lateral play in the case under the licking action of the animals, sufficient to allow the lower or supported end to rock slightly in the case, and thus shift slightly on the bail from side to side to change its point of contact with the bail from time to time, and thus allow the salt to be evenly licked away from under the bail by the insinuating action of the tongues, thereby insuring the wearing off of the lower end of the block in a smooth, rounded, or nearly-regular manner, free from any appreciable prominences, as might exist if the block were immovable in the case or on the bail, or if the point of support were flat or wide, as will be readily appreciated.

Instead of having the case and the salt block cylindrical, it may be of any other form—for example, square or oblong in cross-section, as in Fig. 4—the block being a free fit for the case, as before stated. The wire bail $d$, instead of extending diametrically under and across the block, as in Figs. 1, 2, and 3, may extend from one side of the case only in a V-shaped form, the apex of which underlies and supports the end of the block centrally, or thereabout, as shown in Fig. 4. The lower end of the case may terminate straight or squarely at the exposing-opening through which the block protrudes, as seen in Fig. 1, or it may be cut off obliquely, as seen in Fig. 4.

In Figs. 1 and 2 the case is shown provided with a removable lid, $f$, to protect the block from the weather if the device is used out-of-doors, or to prevent accidental removal of the block; but this lid may be omitted, as shown in Fig. 4, particularly if the device is made for indoor use.

Fig. 5 indicates that the salt block may be formed with a longitudinal or vertical groove, $e$, to engage with a vertical rib or flange, $g$, on the inside of the case, which will hold the block accurately in the case, insure the straight-down feed of the same, and prevent the rotation of the block or the too great or irregular movement thereof in the case, due to vigorous licking, and also enable a short piece or fag end to remain longer in the case without being dislodged by the licking action or attempts to bite the salt.

Fig. 6 shows that the case and block may be made oval in cross-section, and it is obvious that various other modifications of form may be used without departing from our invention; but we prefer the round, square, or oval forms shown in Figs. 1, 4, and 6.

It may now be appreciated that these salt blocks may be readily pressed, molded, or cut in the form of simple solid blocks of cylindrical, oval, or square shape with rounded ends, and that the construction of the case for holding the same is very simple and inexpensive; consequently the device may be made and sold cheaply. Furthermore, it will be seen that in use the salt is effectually protected from waste and from attempts of the animals to bite or destroy the same, whereas it is conveniently presented for easy use by the licking action of the tongue, and as fast as thus worn away will be evenly and constantly fed to the point of support and consumption in a most efficient and simple manner.

Where the square form is used, as in Fig. 4, the salt may be solidified in large blocks or cakes, which can be readily sawed up into blocks of the proper size to fit the cases, which is one advantage of this form, and will simplify the process of molding and baking the salt.

Any suitable medicinal substances or other desirable ingredients may of course be combined with the salt; but my invention obviously does not concern the composition of the salt block, nor necessarily, in fact, the substance of the block itself, provided it is adapted for action and use, as described. Indeed, if desired, in some cases sugar, with or without other ingredients, may be solidified into blocks like the salt and put in the cases and fed in the same manner to stock if it should be found desirable for some special purposes.

We generally prefer to fix the cases in place in a plumb or vertical position, as shown in the drawings; but they may be set in an inclined position, if desired.

What we claim is—

1. In a salt or food feeding device, the combination, with a protecting case or frame having an exposing-opening, of a solid salt or food block fitting the same loosely and protruding at one end from the exposing-opening, with a narrow point of support projecting from the case out under the block and contacting with the protruding end of the block at or near the middle thereof, substantially as and for the purpose set forth.

2. In a salt-feeding device, the combination, with a case, $a$, having an exposing-opening at the base, of the supporting-bail $d$ under said opening, with the sliding or gravitating salt or feed block c, loosely fitting said case and adapted to rest on said bail at its exposed or protruding end, substantially as herein set forth.

3. The combination, with the sliding or gravitating salt or food block c, of the case a, having the attaching base or ears b, and the supporting-bail d, arranged and operating substantially as herein shown and described.

4. The combination of the case a, ears or base b, lid f, and loop or bail d with the salt or food block c, arranged and operating substantially as shown and described.

CHARLES LINDNER.
THORVALD F. HAMMER.

Witnesses:
LESTER J. NICHOLS,
CHRISTIAN B. GRAVES.